United States Patent
Yano et al.

(10) Patent No.: US 12,087,902 B2
(45) Date of Patent: Sep. 10, 2024

(54) ALL-SOLID LITHIUM ION SECONDARY BATTERY

(71) Applicant: TDK CORPORATION, Tokyo (JP)

(72) Inventors: Tomohiro Yano, Tokyo (JP); Teiichi Tanaka, Tokyo (JP); Taisuke Masuko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 454 days.

(21) Appl. No.: 16/960,805

(22) PCT Filed: Jan. 10, 2019

(86) PCT No.: PCT/JP2019/000480
§ 371 (c)(1),
(2) Date: Jul. 8, 2020

(87) PCT Pub. No.: WO2019/139070
PCT Pub. Date: Jul. 18, 2019

(65) Prior Publication Data
US 2020/0365935 A1    Nov. 19, 2020

(30) Foreign Application Priority Data

Jan. 10, 2018   (JP) .................................. 2018-002210

(51) Int. Cl.
*H01M 10/0525* (2010.01)
*H01M 4/02* (2006.01)
*H01M 4/04* (2006.01)
*H01M 4/36* (2006.01)
(Continued)

(52) U.S. Cl.
CPC ..... *H01M 10/0525* (2013.01); *H01M 4/0404* (2013.01); *H01M 4/0471* (2013.01);
(Continued)

(58) Field of Classification Search
CPC .......... H01M 10/0525; H01M 4/0471; H01M 10/0562; H01M 4/366; H01M 2300/0068
See application file for complete search history.

(56) References Cited

U.S. PATENT DOCUMENTS

2015/0325887 A1* 11/2015 Kim .................... H01M 50/103
                                                                                            429/9
2015/0333366 A1   11/2015 Sato et al.
(Continued)

FOREIGN PATENT DOCUMENTS

DE    102014201539    *  7/2015
JP    2006-261008 A       9/2006
(Continued)

OTHER PUBLICATIONS

Apr. 16, 2019 Search Report issued in International Patent Application No. PCT/JP2019/000480.
(Continued)

*Primary Examiner* — Matthew T Martin
*Assistant Examiner* — Taylor Harrison Krone
(74) *Attorney, Agent, or Firm* — Oliff PLC (57) ABSTRACT

An all-solid lithium ion secondary battery includes a laminate including a positive electrode layer, a negative electrode layer which is alternately laminated with the positive electrode layer, a solid electrolyte which is interposed at least between the positive electrode layer and the negative electrode layer, and an insulating outermost layer which is positioned at both ends in a lamination direction and does not contain lithium ions.

11 Claims, 3 Drawing Sheets

(51) Int. Cl.
    *H01M 4/505*     (2010.01)
    *H01M 4/525*     (2010.01)
    *H01M 10/0562*   (2010.01)

(52) U.S. Cl.
    CPC .......... *H01M 4/366* (2013.01); *H01M 4/505* (2013.01); *H01M 4/525* (2013.01); *H01M 10/0562* (2013.01); *H01M 2004/027* (2013.01); *H01M 2004/028* (2013.01); *H01M 2300/0068* (2013.01)

(56) References Cited

U.S. PATENT DOCUMENTS

| | | | | |
|---|---|---|---|---|
| 2017/0222272 A1* | 8/2017 | Takami | ............... | H01M 4/5825 |
| 2017/0373300 A1* | 12/2017 | Maeda | ............... | H01M 10/0436 |
| 2019/0252727 A1* | 8/2019 | Shimizu | ............... | H01M 4/667 |

FOREIGN PATENT DOCUMENTS

| | | | | |
|---|---|---|---|---|
| JP | 2006261008 | * | 9/2006 | .......... H01M 10/052 |
| JP | 2016-001595 A | | 1/2016 | |
| JP | 2016001601 | * | 1/2016 | |
| JP | 2017-182945 A | | 10/2017 | |
| JP | 2017182945 | * | 10/2017 | |
| WO | 2014/007215 A1 | | 1/2014 | |
| WO | WO-2019103008 A1 | * | 5/2019 | ........ H01M 10/0525 |

OTHER PUBLICATIONS

Jul. 19, 2022 Office Action issued in Japanese Patent Application No. 2019-564728.

Feb. 24, 2023 Office Action issued in Chinese Application 201980007608.8.

* cited by examiner

ALL-SOLID LITHIUM ION SECONDARY BATTERY

TECHNICAL FIELD

The present disclosure relates to an all-solid lithium ion secondary battery.

Priority is claimed on Japanese Patent Application No. 2018-002210, filed Jan. 10, 2018, the content of which is incorporated herein by reference.

BACKGROUND ART

Lithium ion secondary batteries are widely used as power supplies for portable small devices, for example, mobile phones, laptops, and PDAs. Lithium ion secondary batteries used for such portable small devices are required to be smaller, thinner and more reliable.

Regarding lithium ion secondary batteries, those in which an organic electrolytic solution is used as an electrolyte and those using a solid electrolyte are known. Compared to a lithium ion secondary battery using an organic electrolytic solution, a lithium ion secondary battery (all-solid lithium ion secondary battery) in which a solid electrolyte is used as an electrolyte has a higher degree of freedom in design of the shape of the battery, and a small-sized and thin battery can be easily obtained. In addition, the all-solid lithium ion secondary battery has an advantage of high reliability without leaking of an electrolytic solution.

In addition, the all-solid lithium ion secondary battery is nonflammable. Accordingly, the all-solid lithium ion secondary battery has an advantage that it can be mounted on a substrate by reflow soldering like other electronic components.

For example, Patent Literature 1 describes an all-solid lithium ion secondary battery in which lithium titanium aluminum phosphate is used for a solid electrolyte layer.

CITATION LIST

Patent Literature

[Patent Literature 1]
Japanese Unexamined Patent Application, First Publication No. 2016-1595

SUMMARY OF INVENTION

Technical Problem

However, the all-solid lithium ion secondary battery described in Patent Literature 1 tends to self-discharge at a certain rate.

The present disclosure has been made in view of the above circumstances and an object of the present disclosure is to provide an all-solid lithium ion secondary battery that can curb self-discharging.

Solution to Problem

The inventors conducted extensive studies in order to address the above problems.

As a result, the inventors have found the following points. That is, in the related art, it was thought that both ends of a positive electrode layer and a negative electrode layer in a lamination direction had no influence on performance of the all-solid lithium ion secondary battery. However, the inventors found that, when a solid electrolyte containing Li ions is present at both ends of the positive electrode layer and the negative electrode layer in the lamination direction, the lithium ions move unintentionally and as a result, self-discharging may occur. This is thought to have been caused by the fact that, unlike a capacitor which uses an original insulating dielectric material, a solid electrolyte has ion conductivity, and lithium ions move inside the solid electrolyte.

Figure 3:
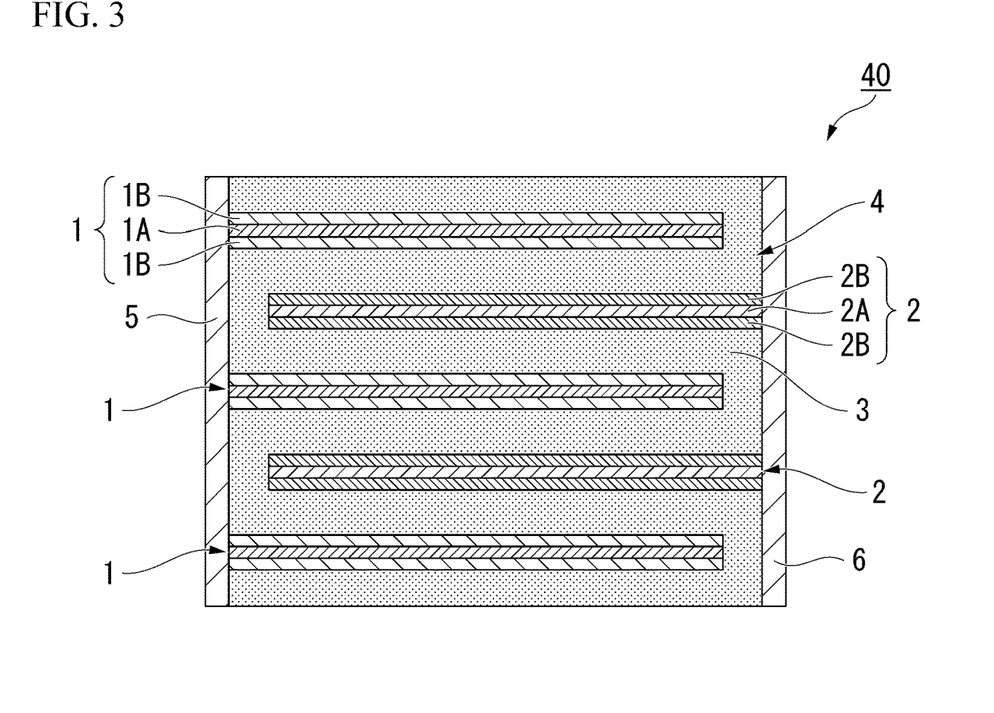
FIG. 3 is a schematic cross-sectional view of an enlarged main part of an all-solid lithium ion secondary battery in the related art.

As shown in FIG. 3, in the technology described in Patent Literature 1, a solid electrolyte 3 containing lithium titanium aluminum phosphate is provided at both ends of a positive electrode layer 1 and a negative electrode layer 2 in a lamination direction. Therefore, self-discharging may occur at a certain rate.

In order to solve the above problems, the following aspects are provided.

(1) An all-solid lithium ion secondary battery according to a first aspect includes a laminate including a positive electrode layer;

a negative electrode layer which is alternately laminated with the positive electrode layer;

a solid electrolyte which is interposed at least between the positive electrode layer and the negative electrode layer; and an insulating outermost layer which is positioned at both ends in a lamination direction and does not contain lithium ions.

(2) In the all-solid lithium ion secondary battery according to the above aspect, the outermost layer may contain Si and one of B and Ba.

(3) In the all-solid lithium ion secondary battery according to the above aspect, a first external terminal and a second external terminal may be formed in contact with side surfaces of the laminate, the positive electrode layer may be connected to the first external terminal and the negative electrode layer may be connected to the second external terminal, and an insulation layer made of the same material as the outermost layer may be formed so that it surrounds a side surface that is not connected to the first external terminal of the positive electrode layer and a side surface that is not connected to the second external terminal of the negative electrode layer in a plan view.

(4) In the all-solid lithium ion secondary battery according to the above aspect, the outermost layer may be a glass sintered component having a softening temperature of 500° C. to 900° C.

(5) In the all-solid lithium ion secondary battery according to the above aspect, the outermost layer may be a sintered component of an insulator raw material having a coefficient of thermal expansion of $50 \times 10^{-7}/°$ C. or higher.

Advantageous Effects of Invention

According to the aspects, it is possible to provide an all-solid lithium ion secondary battery that can curb self-discharging.

DESCRIPTION OF EMBODIMENTS

The present disclosure will be appropriately described below in detail with reference to the drawings. In the drawings used in the following description, in order to facilitate understanding of features of the present disclosure, feature parts are enlarged for convenience of illustration in some cases. Therefore, ratios between sizes and the like of components illustrated in the drawings may be different from those of actual components. Materials, sizes and the like exemplified in the following description are examples, the present disclosure is not limited thereto, and they can be appropriately changed within a range in which effects thereof are obtained.

[All-Solid Lithium Ion Secondary Battery]

Figure 1:
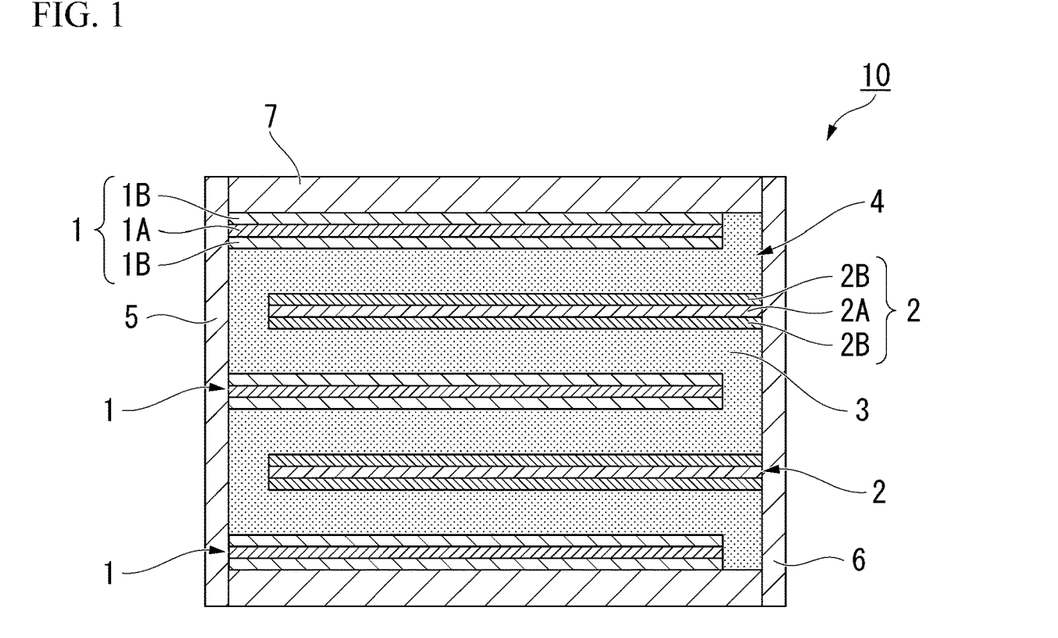
FIG. 1 is a schematic cross-sectional view of an enlarged main part of an all-solid lithium ion secondary battery according to the present embodiment.

FIG. 1 is a schematic cross-sectional view of an enlarged main part of an all-solid lithium ion secondary battery according to the present embodiment. As shown in FIG. 1, an all-solid lithium ion secondary battery 10 includes a laminate 4, a first external terminal 5, and a second external terminal 6. The first external terminal 5 and the second external terminal 6 are formed on side surfaces of the laminate 4. The laminate 4 includes first electrode layers 1, second electrode layers 2 which are alternately laminated with the first electrode layers 1, a solid electrolyte 3 interposed at least between the first electrode layer 1 and the second electrode layer 2, and an insulating outermost layer 7 which is positioned at both ends in the lamination direction and does not contain Li Each of the first electrode layers 1 is connected to the first external terminal 5. Each of the second electrode layers 2 is connected to the second external terminal 6. The first external terminal 5 and the second external terminal 6 are electrical contacts for the outside.

As shown in FIG. 1, the first external terminal 5 and the second external terminal 6 are formed to be in contact with side surfaces (exposed end surfaces of the first electrode layer 1 and the second electrode layer 2) of the laminate 4.

(Laminate)

As described above, the laminate 4 includes the first electrode layer 1, the second electrode layer 2, the solid electrolyte 3, and the outermost layer 7.

One of the first electrode layer 1 and the second electrode layer 2 functions as a positive electrode and the other thereof functions as a negative electrode. Hereinafter, in order to facilitate understanding, the first electrode layer 1 will be referred to as the positive electrode layer 1, and the second electrode layer 2 will be referred to as the negative electrode layer 2.

In the laminate 4, the positive electrode layer 1 and the negative electrode layer 2 are alternately laminated with the solid electrolyte 3 therebetween. The all-solid lithium ion secondary battery 10 is charged and discharged when lithium ions are transferred between the positive electrode layer 1 and the negative electrode layer 2 with the solid electrolyte 3 therebetween.

<Positive Electrode Layer and Negative Electrode Layer>

The positive electrode layer 1 includes a positive electrode current collector layer 1A and a positive electrode active material layer 1B containing a positive electrode active material. The negative electrode layer 2 includes a negative electrode current collector layer 2A and a negative electrode active material layer 2B containing a negative electrode active material.

The positive electrode current collector layer 1A and the negative electrode current collector layer 2A preferably have high conductivity. Therefore, it is preferable to use, for example, silver, palladium, gold, platinum, aluminum, copper, nickel, or the like for the positive electrode current collector layer 1A and the negative electrode current collector layer 2A. Among these materials, copper is unlikely to react with a positive electrode active material, a negative electrode active material or a solid electrolyte. Therefore, when copper is used for the positive electrode current collector layer 1A and the negative electrode current collector layer 2A, the internal resistance of the all-solid lithium ion secondary battery 10 can be reduced. Here, materials constituting the positive electrode current collector layer 1A and the negative electrode current collector layer 2A may be the same as or different from each other.

The positive electrode active material layer 1B is formed on one surface or both surfaces of the positive electrode current collector layer 1A. For example, when the positive electrode layer 1 is formed as the uppermost layer of the laminate 4 in the lamination direction between the positive electrode layer 1 and the negative electrode layer 2, there is no opposing negative electrode layer 2 on the positive electrode layer 1 positioned on the uppermost layer. In such a case, in the positive electrode layer 1 positioned on the uppermost layer, the positive electrode active material layer 1B may be provided only on one surface on the lower side in the lamination direction or may be provided on both sides.

As in the positive electrode active material layer 1B, the negative electrode active material layer 2B is also formed on one surface or both surfaces of the negative electrode current collector layer 2A. In addition, when the negative electrode layer 2 is formed as the lowermost layer of the laminate 4 in the lamination direction between the positive electrode layer 1 and the negative electrode layer 2, the negative electrode active material layer 2B in the negative electrode layer 2 positioned on the lowermost layer may be provided only on one surface on the upper side in the lamination direction or may be provided on both sides.

The positive electrode active material layer 1B and the negative electrode active material layer 2B contain a positive electrode active material and a negative electrode active material which transfer electrons. In addition, the positive electrode active material layer 1B and the negative electrode active material layer 2B may contain a conductivity aid, a binding agent, and the like. Preferably, the positive electrode active material and the negative electrode active material can efficiently occlude and release lithium ions.

For the positive electrode active material and the negative electrode active material, for example, a transition metal oxide or transition metal composite oxide is preferably used. Specifically, lithium manganese composite oxide $Li_2MnMa_{1-a}O_3$ (0.8≤a≤1, Ma=Co, Ni), lithium cobalt oxide ($LiCoO_2$), lithium nickelate ($LiNiO_2$), lithium manganese spinel ($LiMn_2O_4$), a composite metal oxide represented by general formula: $LiNi_xCo_yMn_zO_2$ (x+y+z=1, 0≤x≤1, 0≤y≤1, 0≤z≤1), a lithium vanadium compound ($LiV_2O$), an olivine type $LiMbPO_4$ (where, Mb is one or more elements selected from among Co, Ni, Mn, Fe, Mg, Nb, Ti, Al, and Zr), lithium vanadium phosphate ($Li_3V_2(PO_4)_3$ or $LiVOPO_4$), a Li-rich solid solution represented by $Li_2MnO_3$-$LiMcO_2$(Mc=Mn, Co, Ni), lithium titanate ($Li_4Ti_5O_{12}$), a composite metal oxide represented by $Li_sNi_tCo_uAl_vO_2$ ($0.9<s<1.3$, $0.9<t+u+v<1.1$), and the like can be used.

The positive electrode active material and the negative electrode active material may be selected according to the solid electrolyte 3 to be described below.

For example, when $Li_{1+n}Al_nTi_{2-n}(PO_4)_3$ ($0 \leq n \leq 0.6$) is used for the solid electrolyte 3, one or both of $LiVOPO_4$ and $Li_3V_2(PO_4)_3$ are preferably used for the positive electrode active material and the negative electrode active material. Bonding at the interface between the solid electrolyte 3 of each of the positive electrode active material layer 1B and the negative electrode active material layer 2B becomes strong. In addition, a contact area at the interface between the solid electrolyte 3 and each of the positive electrode active material layer 1B and the negative electrode active material layer 2B can be widened.

There is no clear distinction between active materials constituting the positive electrode active material layer 1B and the negative electrode active material layer 2B. Comparing potentials of two compounds, a compound exhibiting a higher potential can be used for the positive electrode active material, and a compound exhibiting a lower potential can be used as the negative electrode active material.

In addition, the positive electrode current collector layer 1A and the negative electrode current collector layer 2A may contain a positive electrode active material and a negative electrode active material, respectively. The content ratio of the active materials included in the current collector layers is not particularly limited as long as the active materials function as a current collector. For example, the volume ratio of the positive electrode current collector/the positive electrode active material or the negative electrode current collector/the negative electrode active material is preferably in a range of 90/10 to 70/30.

When the positive electrode current collector layer 1A and the negative electrode current collector layer 2A contain a positive electrode active material and a negative electrode active material, respectively, adhesion between the positive electrode current collector layer 1A and the positive electrode active material layer 1B and between the negative electrode current collector layer 2A and the negative electrode active material layer 2B is improved.

<Solid Electrolyte>

The solid electrolyte 3 is interposed at least between the positive electrode layer 1 and the negative electrode layer 2.

Regarding the solid electrolyte 3, a material having low electron conductivity and high lithium ion conductivity is preferably used.

Specifically, for example, it is desirable to select at least one selected from the group consisting of perovskite type compounds such as $La_{0.51}Li_{0.34}TiO_{2.94}$ and $La_{0.5}Li_{0.5}TiO_3$, Lisicon compounds such as $Li_{14}Zn(GeO_4)_4$, garnet type compounds such as $Li_7La_3Zr_2O_2$, Nasicon type compounds such as $Li_{1.3}Al_{0.3}Ti_{1.7}(PO_4)_3$ and $Li_{1.5}Al_{0.5}Ge_{1.5}(PO_4)_3$, thio-Lisicon compounds such as $Li_{3.25}Ge_{0.25}P_{0.75}S_4$ and $Li_3PS_4$, glass compounds such as $50Li_4SiO_4 \cdot 50Li_3BO_3$, $Li_2S$—$P_2S_5$ and $Li_2O$—$Li_3O_5$—$SiO_2$, phosphoric acid compounds such as $Li_3PO_4$, $Li_{3.5}Si_{0.5}P_{0.5}O_4$ and $Li_{2.9}PO_{3.3}N_{0.46}$, amorphous compounds such as $Li_{2.9}PO_{3.3}N_{0.46}$ (LIPON) and $Li_{3.6}Si_{0.6}P_{0.4}O_4$, and glass ceramics such as $Li_{1.07}Al_{0.69}Ti_{1.46}(PO_4)_3$ and $Li_{1.5}Al_{0.5}Ge_{1.5}(PO_4)_3$.

When a material used as the solid electrolyte 3 is selected, as will be described below, it is necessary to focus on a combination of materials constituting the outermost layer 7.

<Outermost Layer>

The outermost layer 7 is positioned at both ends in the lamination direction and does not contain lithium ions and is insulating.

As shown in FIG. 3, in an all-solid lithium ion secondary battery 40 in the related art, no outermost layer is formed at either of ends of the positive electrode layer 1 and the negative electrode layer 2 in the lamination direction, and the solid electrolyte 3 is present at both ends. The solid electrolyte 3 contains Li ions. Therefore, a leakage current may be generated when Li ions move to both ends of the positive electrode layer 1 and the negative electrode layer 2 in the lamination direction. The all-solid lithium ion secondary battery 40 in the related art tends to self-discharge due to the generated leakage current.

On the other hand, the outermost layer 7 according to the present embodiment does not contain lithium ions and has an insulating property. Therefore, since lithium ions do not move in the outermost layer 7, no leakage current is generated, and self-discharging can be curbed.

The outermost layer 7 has an insulating property because the outermost layer 7 is made of an insulator. The insulator constituting the outermost layer 7 can be obtained by sintering an insulator raw material such as a glass frit.

Here, in the present embodiment, the insulator indicates a material having a resistance value of $10^6 \Omega$ or more.

Examples of insulator raw materials include $SiO_2 \cdot B_2O_3$, $Bi_2O_3 \cdot B_2O_3 \cdot SiO_2$, $Bi_2O_3 \cdot B_2O_3$, $Bi_2O_3 \cdot B_2O_3 \cdot Al_2O_3$, $Bi_2O_3 \cdot B_2O_3 \cdot ZnO$, $ZnO \cdot Bi_2O_3 \cdot B_2O_3$, $Bi_2O_3 \cdot ZnO \cdot B_2O_3$, $PbO \cdot SiO_2$, $PbO \cdot B_2O_3$, $SiO_2 \cdot BaO \cdot B_2O_3$, $PbO \cdot SiO_2 \cdot B_2O_3$, $PbO \cdot SiO_2 \cdot Al_2O_3$, $SiO_2 \cdot ZnO \cdot CaO$, $ZnO \cdot B_2O_3 \cdot SiO_2$, $SiO_2 \cdot BaO \cdot ZnO$, $BaO \cdot SiO_2 \cdot ZnO$, $SiO_2 \cdot RO$, $SiO_2 \cdot B_2O_3 \cdot BaO$, $BaO \cdot B_2O_3 \cdot ZnO$, $SiO_2 \cdot TiO_2 \cdot R_2O$, $BaO \cdot SiO_2 \cdot B_2O_3$, $RO \cdot B_2O_3 \cdot SiO_2$, $ZnO \cdot B_2O_3$, $SnO \cdot P_2O_5$, $SiO_2 \cdot BaO \cdot Li_2O$, $Bi_2O_3 \cdot BaO \cdot B_2O_3$, $SiO_2R_2O \cdot TiO_2$, and $SiO_2 \cdot R_2O \cdot BaO$. That is, these insulator raw materials are sintered and thereby an insulator forming the outermost layer 7 is obtained.

Here, R in the above chemical formula represents at least one of the alkaline earth metals Mg, Ca, Sr, and Ba.

The insulator raw material is preferably a glass having a softening temperature (softening point) of 500° C. to 900° C. and more preferably 600° C. to 800° C. That is, the outermost layer 7 is preferably made of a glass sintered component having a softening temperature (softening point) of 500° C. to 900° C. and more preferably 600° C. to 800° C.

Examples of glasses that satisfy the above conditions include $Bi_2O_3 \cdot B_2O_3 \cdot Al_2O_3$, $SiO_2 \cdot BaO \cdot B_2O_3$, $PbO \cdot SiO_2 \cdot Al_2O_3$, $SiO_2 \cdot ZnO \cdot CaO$, $ZnO \cdot B_2O_3 \cdot SiO_2$, $SiO_2 \cdot BaO \cdot ZnO$, $BaO \cdot SiO_2 \cdot ZnO$, $SiO_2RO$, $SiO_2 \cdot B_2O_3 \cdot BaO$, $SiO_2 \cdot TiO_2 \cdot R_2O$, $BaO \cdot SiO_2 \cdot B_2O_3$, $Bi_2O_3 \cdot ZnO \cdot B_2O_3$, $PbO \cdot SiO_2$, $RO \cdot B_2O_3 \cdot SiO_2$, and $ZnO \cdot B_2O_3$.

When the above conditions are satisfied, this is preferable because the outermost layer 7, the positive electrode layer 1, the negative electrode layer 2, and the solid electrolyte 3 can be sintered at the same time when the all-solid lithium ion secondary battery 10 is produced. That is, the outermost layer 7 having an excellent insulating property can be obtained even during low temperature sintering, and self-discharging can be curbed.

Here, in the present embodiment, glass indicates an amorphous solid that exhibits a glass transition phenomenon.

The outermost layer 7 preferably contains Si, and one of B and Ba. When the outermost layer 7 contains Si and one of B and Ba, this is preferable because, for example, sintering is possible at a low temperature, it becomes a material having an excellent insulating property even if simultaneous sintering with the laminate 4 is performed, and self-discharging can be further curbed.

In order for the outermost layer 7 to contain Si and one of B and Ba, regarding the insulator raw material, for example, $SiO_2 \cdot B_2O_3$, $Bi_2O_3 \cdot B_2O_3 \cdot SiO_2$, $SiO_2 \cdot BaO \cdot B_2O_3$, $SiO_2 \cdot BaO \cdot ZnO$, $BaO \cdot SiO_2 \cdot ZnO$, $SiO_2 \cdot B_2O_3 \cdot BaO$, $ZnO \cdot B_2O_3 \cdot SiO_2$, $BaO \cdot SiO_2 \cdot B_2O_3$, $RO \cdot B_2O_3 \cdot SiO_2$, $SiO_2 \cdot BaO \cdot Li_2O$, $SiO_2 \cdot R_2O \cdot BaO$ or the like may be used.

The insulator constituting the outermost layer 7 preferably has crystallinity. When the insulator constituting the outermost layer 7 has crystallinity, since the density increases, the mechanical strength of the outermost layer 7 increases. Therefore, it is possible to reduce a likelihood of the outermost layer 7 cracking due to the change in the volume resulting from charging and discharging of the battery. In addition, since the outermost layer 7 having an excellent insulating property can be obtained even if charging and discharging are repeated, self-discharging can be further reduced.

In order for the insulator to have crystallinity, regarding the insulator raw material, for example, $Bi_2O_3 \cdot B_2O_3$, $Bi_2O_3 \cdot B_2O_3 \cdot Al_2O_3$, $Bi_2O_3 \cdot B_2O_3 \cdot ZnO$, $ZnO \cdot Bi_2O_3 \cdot B_2O_3$, $PbO \cdot SiO_2 \cdot Al_2O_3$, $SiO_2 \cdot ZnO \cdot CaO$, $ZnO \cdot B_2O_3 \cdot SiO_2$, $SiO_2 \cdot BaO \cdot ZnO$, $BaO \cdot B_2O_3 \cdot ZnO$, $SiO_2 \cdot TiO_2 \cdot R_2O$, $BaO \cdot SiO_2 \cdot B_2O_3$, $RO \cdot B_2O_3 \cdot SiO_2$, $ZnO \cdot B_2O_3$, or $SiO_2 \cdot BaO \cdot Li_2O$ may be used.

The outermost layer 7 is preferably composed of a sintered component (insulator) obtained by mixing two or more insulator raw materials and firing the mixture. When insulator raw materials are suitably mixed, it is possible to adjust adhesion between the outermost layer 7 and other layers (the positive electrode layer 1, the negative electrode layer 2, and the solid electrolyte 3) and the coefficient of thermal expansion of the all-solid lithium ion secondary battery 10. Therefore, it is possible to minimize abnormalities of the appearance such as peeling off or cracking of the all-solid lithium ion secondary battery 10. In addition, it is preferable to mix insulator raw materials suitably because a material having an excellent insulating property can be obtained even at low temperature sintering.

Examples of mixtures of insulator raw materials include a mixture of $Bi_2O_3 \cdot B_2O_3 \cdot SiO_2:SiO_2 \cdot BaO \cdot CaO=50:50$, a mixture of $Bi_2O_3 \cdot B_2O_3 \cdot SiO_2:SiO_2B_2O_3RO=50:50$, and a mixture of $SiO_2 \cdot BaO \cdot CaO:SiO_2 \cdot B_2O_3 \cdot RO=50:50$.

The ratio and combination of insulator raw materials can be appropriately determined according to desired performance.

The coefficient of thermal expansion of the insulator raw material is preferably $50 \times 10^{-7}/°$ C. or higher, and more preferably $60 \times 10^{-7}/°$ C. or higher and $80 \times 10^{-7}/°$ C. or lower. That is, the outermost layer 7 is preferably made of a sintered component of an insulator raw material having a coefficient of thermal expansion of $50 \times 10^{-7}/°$ C. or higher, and more preferably $60 \times 10^{-7}/°$ C. or higher and $80 \times 10^{-7}/°$ C. or lower.

When the coefficient of thermal expansion of the insulator raw material is $50 \times 10^{-7}/°$ C. or higher, a difference in the coefficient of thermal expansion between the outermost layer 7 and other layers (the positive electrode layer 1, the negative electrode layer 2, and the solid electrolyte 3) becomes smaller. Therefore, it is possible to reduce cracking due to the difference in thermal expansion and it is possible to obtain the outermost layer 7 having an excellent insulating property even after charging and discharging are repeated, and thus self-discharging can be further curbed.

Examples of an insulator raw material having a coefficient of thermal expansion of $50 \times 10^{-7}/°$ C. or higher include $Bi_2O_3 \cdot B_2O_3 \cdot SiO_2$, $Bi_2O_3 \cdot B_2O_3$, $Bi_2O_3 \cdot B_2O_3 \cdot Al_2O_3$, $Bi_2O_3 \cdot B_2O_3 \cdot ZnO$, $ZnO \cdot Bi_2O_3 \cdot B_2O_3$, $Bi_2O_3 \cdot ZnO \cdot B_2O_3$, $PbO \cdot SiO_2$, $PbO \cdot B_2O_3$, $SiO_2 \cdot BaO \cdot B_2O_3$, $PbO \cdot SiO_2 \cdot B_2O_3$, $PbO \cdot SiO_2 \cdot Al_2O_3$, $SiO_2 \cdot ZnO \cdot CaO$, $ZnO \cdot B_2O_3 \cdot SiO_2$, $SiO_2 \cdot BaO \cdot ZnO$, $BaO \cdot SiO_2 \cdot ZnO$, $SiO_2 \cdot RO$, $SiO_2 \cdot B_2O_3 \cdot BaO$, $BaO \cdot B_2O_3 \cdot ZnO$, $SiO_2 \cdot TiO_2 \cdot R_2O$, $BaO \cdot SiO_2 \cdot B_2O_3$, $RO \cdot B_2O_3 \cdot SiO_2$, $ZnO \cdot B_2O_3$, $SnO \cdot P_2O_5$, $SiO_2 \cdot BaO \cdot Li_2O$, $Bi_2O_3 \cdot BaO \cdot B_2O_3$, $SiO_2 \cdot R_2O \cdot TiO_2$, and $SiO_2 \cdot R_2O \cdot BaO$.

As described above, it is necessary to focus on a combination of a material used as the solid electrolyte 3 and an insulator (insulator raw material) constituting the outermost layer 7. In consideration of a combination of both, the following combinations are preferable. Regarding the solid electrolyte 3, a Nasicon type compound such as $Li_{1.3}Al_{0.3}Ti_{1.7}(PO_4)_3$ is used. $SiO_2 \cdot B_2O_3 \cdot RO$ is used as an insulator raw material which is a raw material of the insulator constituting the outermost layer 7. This combination is suitable for production because firing temperatures of both are compatible. In addition to this, it is possible to prevent components of a glass material used for the outermost layer 7 from diffusing into the laminate 4 during sintering.

FIG. 1 shows a case in which the outermost layer 7 is in contact with the positive electrode layer 1. However, the outermost layer 7 may be provided at both ends in the lamination direction and other points are not particularly limited. That is, one end of the outermost layer 7 may be in contact with the positive electrode layer 1 and the other end thereof may be in contact with the negative electrode layer 2. The outermost layer 7 may be in contact with any of the positive electrode layer 1 and the negative electrode layer 2. The outermost layer 7 may be in contact with neither of the positive electrode layer 1 nor the negative electrode layer 2.

Figure 2:
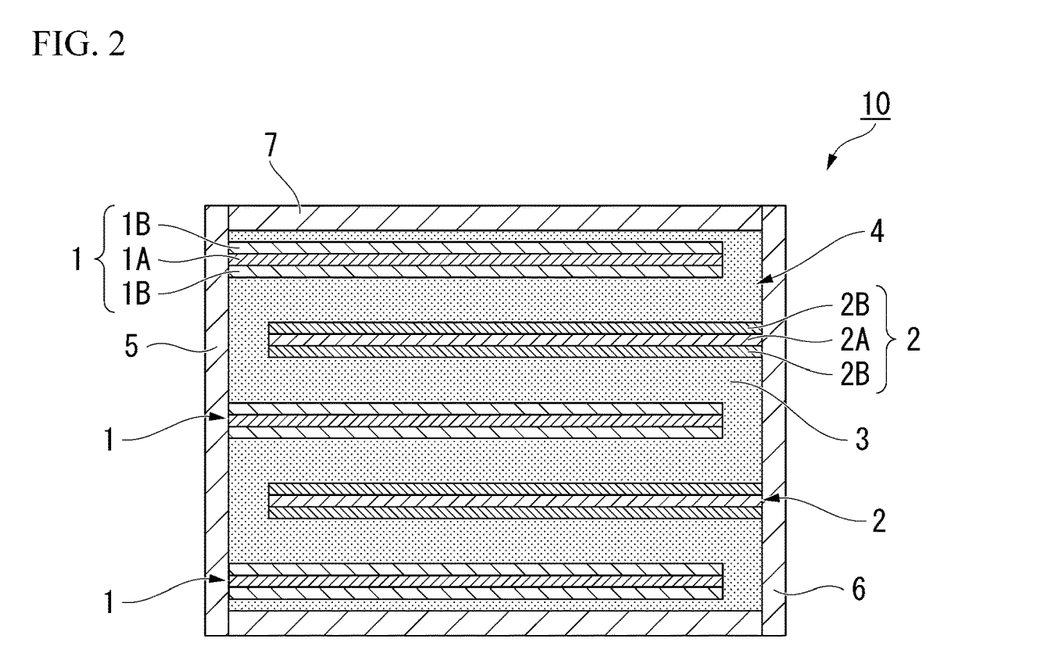
FIG. 2 is a schematic cross-sectional view of an enlarged main part of another all-solid lithium ion secondary battery according to the present embodiment.

A contact mode between the outermost layer 7 and the solid electrolyte 3 is not particularly limited. As shown in FIG. 1, a part of one surface of the outermost layer 7 may be in contact with the solid electrolyte 3. As shown in FIG. 2, the entire one surface of the outermost layer 7 may be in contact with the solid electrolyte 3.

(Terminal)

The all-solid lithium ion secondary battery 10 includes the first external terminal 5 and the second external terminal 6.

In addition, the first external terminal 5 and the second external terminal 6 are electrically connected to electrodes (not shown) provided on a substrate (not shown).

The first external terminal 5 and the second external terminal 6 of the all-solid lithium ion secondary battery 10 are preferably made of a material having high conductivity. For example, silver, gold, platinum, aluminum, copper, tin, and nickel can be used. The first external terminal 5 and the second external terminal 6 may be a single layer or a plurality of layers.

(Protective Layer)

In addition, the all-solid lithium ion secondary battery 10 may include the laminate 4 and protective layers (not shown) for electrically, physically, and chemically protecting the terminals on the outer circumference of the laminate 4.

As a material constituting the protective layer, one that has an excellent insulating property, durability, and humidity resistance and is environmentally safe, is preferable. For example, glass, ceramics, a thermosetting resin or a photocurable resin is preferably used. Materials of the protective layer may be used alone or a plurality thereof may be used in combination. In addition, the protective layer may be a single layer, but a plurality of protective layers are preferable. Among these, an organic-inorganic hybrid in which a thermosetting resin and a ceramic powder are mixed is particularly preferable.

As described above, the all-solid lithium ion secondary battery 10 according to the present embodiment includes the insulating outermost layer 7 that does not contain lithium ions at both ends in the lamination direction. Therefore, in the all-solid lithium ion secondary battery 10 according to the present embodiment, no leakage current is generated and self-discharging can be curbed.

(Method of Producing all-Solid Lithium Ion Secondary Battery)

For a method of producing the all-solid lithium ion secondary battery 10, a simultaneous firing method may be used or a sequential firing method may be used.

The simultaneous firing method is a method in which materials for forming layers are laminated and collectively fired to produce a laminate. The sequential firing method is a method of sequentially producing layers, and a firing process is performed whenever a layer is produced. When the simultaneous firing method is used, it is possible to reduce working processes of the all-solid lithium ion secondary battery 10. In addition, when the simultaneous firing method is used, the obtained laminate 4 becomes denser.

Hereinafter, an example in which the all-solid lithium ion secondary battery 10 shown in FIG. 1 is produced using the simultaneous firing method will be described.

The simultaneous firing method includes a process of producing a paste of materials constituting the laminate 4, a process of applying and drying the paste to produce a green sheet, and a process of laminating the green sheet and simultaneously firing the produced laminated sheet.

First, materials of the positive electrode current collector layer 1A, the positive electrode active material layer 1B, the solid electrolyte 3, the negative electrode active material layer 2B, and the negative electrode current collector layer 2A, and the outermost layer 7 which constitute the laminate 4 are made into pastes.

The material of the outermost layer 7 includes the above insulator raw materials.

A pasting method is not particularly limited. For example, a paste is obtained by mixing powders of materials in a vehicle. Here, the vehicle is a general term for a medium in a liquid phase. The vehicle includes a solvent and a binder. According to such a method, a paste for the positive electrode current collector layer 1A, a paste for the positive electrode active material layer 1B, a paste for the solid electrolyte 3, a paste for the negative electrode active material layer 2B, a paste for the negative electrode current collector layer 2A, and a paste for the outermost layer 7 are produced.

Next, a green sheet is produced. The green sheet is obtained by applying the produced pastes to a substrate such as polyethylene terephthalate (PET) in a desired order, performing drying as necessary, and then peeling off the substrate. A paste applying method is not particularly limited. For example, known methods such as screen printing, application, transferring, and a doctor blade method can be used.

In the present embodiment, the outermost layer 7 is provided at both ends in the lamination direction. Therefore, when a green sheet is produced, first the paste for the outermost layer 7 is applied. Then, the paste for the positive electrode current collector layer 1A, the paste for the positive electrode active material layer 1B, the paste for the solid electrolyte 3, the paste for the negative electrode active material layer 2B, and the paste for the negative electrode current collector layer 2A are applied in a desired order and a desired number of layers. Finally, the paste for the outermost layer 7 is applied again.

As necessary, alignment, cutting and the like are performed to produce a laminate. When a parallel type or serial-parallel type battery is produced, preferably, alignment and lamination are performed so that the end surface of the positive electrode current collector layer and the end surface of the negative electrode current collector layer do not match.

Next, de-binding and firing are performed to produce a sintered component of the laminate.

De-binding and firing can be performed, for example, under a nitrogen atmosphere at a temperature of 600° C. to 1,000° C. A de-binding and firing maintaining time is, for example, 0.1 to 6 hours. Organic components disappear due to the de-binding and firing.

The sintered component may be put into a cylindrical container together with an abrasive material such as alumina and subjected to barrel polishing. Thereby, it is possible to chamfer corners of the laminate. As another method, sandblasting may be performed for polishing. This method is preferable because only a specific part can be cut.

Here, the present disclosure is not limited to the above method, and a mode in which the paste for the positive electrode current collector layer 1A, the paste for the positive electrode active material layer 1B, the paste for the solid electrolyte 3, the paste for the negative electrode active material layer 2B, and the paste for the negative electrode current collector layer 2A are applied and fired, and the paste for the outermost layer 7 is then finally applied and fired may be used.

In addition, when a layer to which the paste for the positive electrode layer 1 is applied and/or a layer to which the paste for the negative electrode layer 2 is applied are thick, step filling printing may be performed on a step part (a margin area in which no paste is applied) formed between the layer and a layer below the layer. Normally, the material of the solid electrolyte 3 is used as a material for step filling printing, but in the present embodiment, the material of the outermost layer 7 may be used as the material for step filling printing.

(Formation of Terminals)

The first external terminal 5 and the second external terminal 6 are attached to the laminate 4. The first external terminal 5 and the second external terminal 6 are formed so that they are electrically in contact with the positive electrode current collector layer 1A and the negative electrode current collector layer 2A, respectively. For example, terminals can be formed by performing known methods such as a sputtering method, a dipping method, and a spray coating method on the positive electrode current collector layer 1A and the negative electrode current collector layer 2A exposed from the side surfaces of the laminate 4. When terminals are formed only in predetermined parts, they are formed by performing, for example, masking with tape.

The embodiments of the present disclosure have been described above in detail with reference to the drawings. Configurations and combinations thereof in the embodiments are only examples, and additions, omissions, substitutions, and other modifications of the configurations can be made without departing from the scope of the present disclosure.

Figure 4:
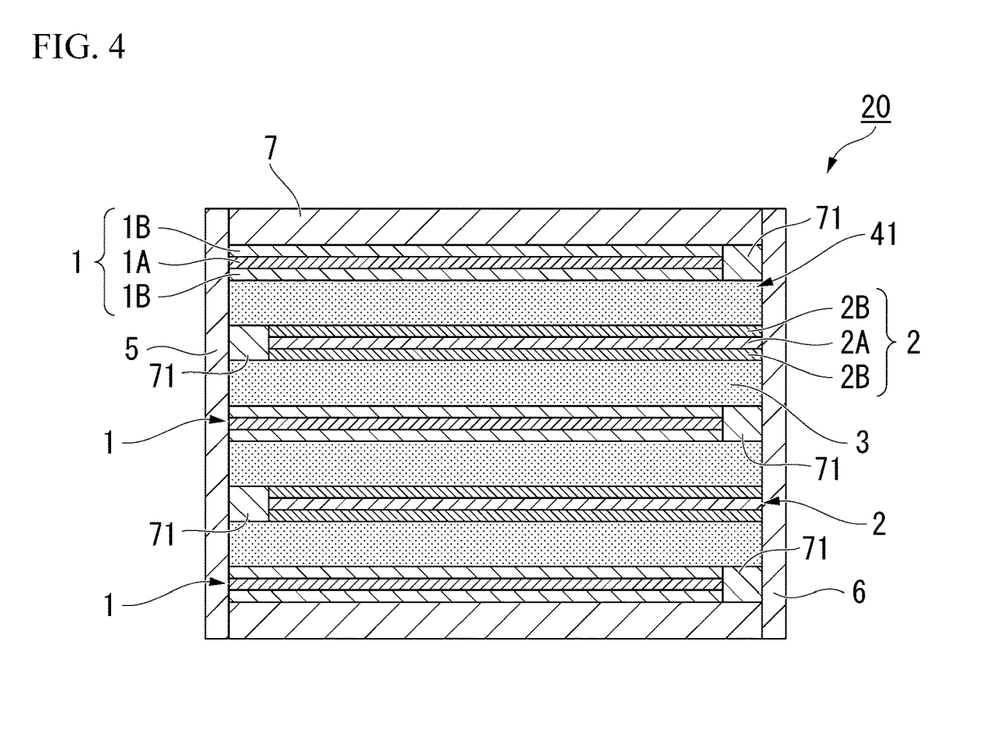
FIG. 4 is a schematic cross-sectional view of an enlarged main part of another example of the all-solid lithium ion secondary battery according to the present embodiment.

FIG. 4 is a schematic cross-sectional view of an enlarged main part of another example of the all-solid lithium ion secondary battery according to the present embodiment. In addition, FIG. 5 is a plan view showing an arrangement of the negative electrode layer 2 and an insulation layer 71 included in an all-solid lithium ion secondary battery 20 shown in FIG. 4.

Figure 5:
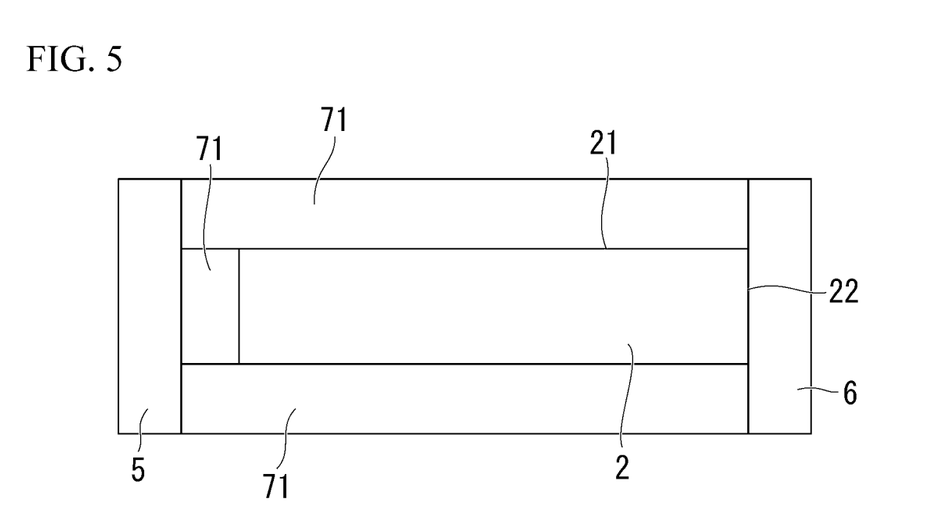
FIG. 5 is a plan view showing an arrangement of a negative electrode layer 2 and an insulation layer 71 included in an all-solid lithium ion secondary battery 20 shown in FIG. 4.

The all-solid lithium ion secondary battery 20 shown in FIG. 4 and FIG. 5 is different from the all-solid lithium ion secondary battery 10 shown in FIG. 1 in the following points.

That is, in the all-solid lithium ion secondary battery 10 shown in FIG. 1, in a plan view, the material of the solid electrolyte 3 is filled in so that it surrounds a side surface that is not connected to the first external terminal 5 of the positive electrode layer 1 and a side surface that is not connected to the second external terminal 6 of the negative electrode layer 2. Therefore, in the all-solid lithium ion secondary battery 10 shown in FIG. 1, the material of the solid electrolyte 3 is filled between the positive electrode layer 1 and the second external terminal 6 and between the negative electrode layer 2 and the first external terminal 5 of the laminate 4 in a cross-sectional view.

On the other hand, in the all-solid lithium ion secondary battery 20 shown in FIG. 4 and FIG. 5, in a plan view, the insulation layer 71 is formed so that it surrounds a side surface that is not connected to the first external terminal 5 of the positive electrode layer 1 and a side surface that is not connected to the second external terminal 6 of the negative electrode layer 2. Therefore, in the all-solid lithium ion secondary battery 20 shown in FIG. 4 and FIG. 5, the insulation layer 71 is formed between the positive electrode layer 1 and the second external terminal 6 and between the negative electrode layer 2 and the first external terminal 5 in a laminate 41 in a cross-sectional view. In FIG. 5, the reference numeral 22 indicates a side surface that is connected to the second external terminal 6 of the negative electrode layer 2, and the reference numeral 21 indicates a side surface that is not connected to the second external terminal 6 of the negative electrode layer 2. The insulation layer 71 is made of the same material as the outermost layer 7.

In the all-solid lithium ion secondary battery 20 shown in FIG. 4 and FIG. 5, the same members as those of the all-solid lithium ion secondary battery 10 shown in FIG. 1 will be denoted with the same reference numerals, and descriptions thereof will be omitted.

The all-solid lithium ion secondary battery 20 shown in FIG. 4 and FIG. 5 can be produced by, for example, the following method.

That is, as in the above case in which the all-solid lithium ion secondary battery 10 shown in FIG. 1 is produced, the paste for the positive electrode current collector layer TA, the paste for the positive electrode active material layer 1B, the paste for the solid electrolyte 3, the paste for the negative electrode active material layer 2B, the paste for the negative electrode current collector layer 2A, and the paste for the outermost layer 7 are produced.

Then, unlike the case in which the all-solid lithium ion secondary battery 10 shown in FIG. 1 is produced, application is performed for producing a green sheet using the above paste according to the following method.

First, the paste for the outermost layer 7 is applied and the paste for the positive electrode layer 1 is applied. More specifically, after the paste for the outermost layer 7 is applied, the paste for the positive electrode active material layer 1B, the paste for the positive electrode current collec-tor layer TA, and the paste for the positive electrode active material layer 1B are applied in this order. Next, the paste for the outermost layer 7 serving as the insulation layer 71 is applied to a step part (a margin area in which no paste for the positive electrode layer 1 is applied) formed between the paste for the positive electrode layer 1 and the paste for the outermost layer 7 applied first so that the step is filled. The step part formed between the paste for the positive electrode layer 1 and the paste for the outermost layer 7 applied first is formed in a part serving as a side surface that is not connected to the first external terminal 5 of the positive electrode layer 1.

Next, the paste for the solid electrolyte 3 is applied and the paste for the negative electrode layer 2 is applied. More specifically, after the paste for the solid electrolyte 3 is applied, the paste for the negative electrode active material layer 2B, the paste for the negative electrode current collector layer 2A, and the paste for the negative electrode active material layer 2B are applied in this order. Next, the paste for the outermost layer 7 serving as the insulation layer 71 is applied to a step part (a margin area in which no paste for the negative electrode layer 2 is applied) formed between the paste for the negative electrode layer 2 and the paste for the solid electrolyte 3 so that the step is filled. The step part formed between the paste for the negative electrode layer 2 and the paste for the solid electrolyte 3 is formed in a part serving as the side surface 21 that is not connected to the second external terminal 6 of the negative electrode layer 2 shown in FIG. 5.

Then, in the same manner as described above, the paste for the solid electrolyte 3, the paste for the positive electrode layer 1, the paste for the negative electrode layer 2, and the paste for the outermost layer 7 serving as the insulation layer 71 are applied in a desired order and a desired number of layers, and finally the paste for the outermost layer 7 is applied again.

Then, the same processes as in production of the all-solid lithium ion secondary battery 10 shown in FIG. 1 are performed, and thus the all-solid lithium ion secondary battery 20 shown in FIG. 4 and FIG. 5 is obtained.

In the all-solid lithium ion secondary battery 20 shown in FIG. 4 and FIG. 5, the insulation layer 71 made of an insulating material which does not contain lithium ions is formed so that it surrounds a side surface that is not connected to the first external terminal 5 of the positive electrode layer 1 and a side surface that is not connected to the second external terminal 6 of the negative electrode layer 2 in a plan view. Therefore, in the all-solid lithium ion secondary battery 20 shown in FIG. 4 and FIG. 5, a leakage current is less likely to be generated and self-discharging is further curbed.

EXAMPLES

Examples 1 to 12

The laminate 4 having the configuration shown in FIG. 1 was produced by the simultaneous firing method. The structure of layers was as follows.

The positive electrode current collector layer 1A and the negative electrode current collector layer 2A: $Cu+Li_3V_2(PO_4)_3$ The positive electrode active material layer 1B and the negative electrode active material layer 2B: $Li_3V_2(PO_4)_3$ The solid electrolyte 3 and the outermost layer 7: As shown in Table 1

The temperature during simultaneous firing was 800° C., and the firing time was 1 hour.

In the laminates 4 of Examples 1 to 12, in a plan view, the solid electrolyte 3 was formed so that it surrounded a side surface that was not connected to the first external terminal 5 of the positive electrode layer 1 and a side surface that was not connected to the second external terminal 6 of the negative electrode layer 2.

cifically, when the voltage was limited to 0 to 1.6 V, the all-solid lithium ion secondary battery was charged, and the residual voltage after 24 hours from charging was measured. Here, a larger residual voltage value indicates that no self-discharging occurred. A smaller residual voltage value indicates that self-discharging occurred.

The residual voltage after 24 hours is shown in Table 1.

TABLE 1

| | Solid electrolyte | Outermost layer (insulator raw material) | Softening point (° C.) | Coefficient of thermal expansion × $10^{-7}$/° C. | Residual voltage (%) after 24 h self-charging |
|---|---|---|---|---|---|
| Example 1 | $Li_{1.3}Al_{0.3}Ti_{1.7}(PO_4)_3$ | $Bi_2O_3$—$B_2O_3$—$SiO_2$ (100%) | 526 | 79 | 80% |
| Example 2 | $Li_{1.3}Al_{0.3}Ti_{1.7}(PO_4)_3$ | $SiO_2$—BaO—CaO (100%) | 500 to 590 | 70 | 90% |
| Example 3 | $Li_{1.3}Al_{0.3}Ti_{1.7}(PO_4)_3$ | $SiO_2$—$B_2O_3$—RO (100%) | 780 | 52 to 60 | 96% |
| Example 4 | $Li_{1.3}Al_{0.3}Ti_{1.7}(PO_4)_3$ | $Bi_2O_3$—$B_2O_3$—$SiO_2$/$SiO_2$—BaO—CaO (50%/50%) | — | — | 83% |
| Example 5 | $Li_{1.3}Al_{0.3}Ti_{1.7}(PO_4)_3$ | $Bi_2O_3$—$B_2O_3$—$SiO_2$/$SiO_2$—$B_2O_3$—RO (50%/50%) | — | — | 92% |
| Example 6 | $Li_{1.3}Al_{0.3}Ti_{1.7}(PO_4)_3$ | $SiO_2$—BaO—CaO/$SiO_2$—$B_2O_3$—RO (50%/50%) | — | — | 92% |
| Example 7 | $Li_{1.07}Al_{0.69}T_{1.46}(PO_4)_3$ | $Bi_2O_3$—$B_2O_3$—$SiO_2$ (100%) | 526 | 79 | 78% |
| Example 8 | $Li_{1.07}Al_{0.69}Ti_{1.46}(PO_4)_3$ | $SiO_2$—BaO—CaO (100%) | 500 to 590 | 70 | 85% |
| Example 9 | $Li_{1.07}Al_{0.69}Ti_{1.46}(PO_4)_3$ | $SiO_2$—$B_2O_3$—RO (100%) | 780 | 52 to 60 | 93% |
| Example 10 | $Li_{1.5}Al_{0.5}Ge_{1.5}(PO_4)_3$ | $Bi_2O_3$—$B_2O_3$—$SiO_2$ (100%) | 526 | 79 | 77% |
| Example 11 | $Li_{1.5}Al_{0.5}Ge_{1.5}(PO_4)_3$ | $SiO_2$—BaO—CaO (100%) | 500 to 590 | 70 | 85% |
| Example 12 | $Li_{1.5}Al_{0.5}Ge_{1.5}(PO_4)_3$ | $SiO_2$—$B_2O_3$—RO (100%) | 780 | 52 to 60 | 93% |
| Comparative Example 1 | $Li_{1.3}Al_{0.3}Ti_{1.7}(PO_4)_3$ | $Li_{1.3}Al_{0.3}Ti_{1.7}(PO_4)_3$ | — | — | 63% |
| Comparative Example 2 | $Li_{1.07}Al_{0.69}Ti_{1.46}(PO_4)_3$ | $Li_{1.07}Al_{0.69}Ti_{1.46}(PO_4)_3$ | — | — | 63% |
| Comparative Example 3 | $Li_{1.5}Al_{0.5}Ge_{1.5}(PO_4)_3$ | $Li_{1.5}Al_{0.5}Ge_{1.5}(PO_4)_3$ | — | — | 63% |

Here, in Table 1, (100%) means that the outermost layer 7 was composed of only an insulator obtained by sintering the insulator raw materials. In addition, in Table 1, when two insulator raw materials are listed, this means that the outermost layer 7 was made of an insulator obtained by sintering two insulator raw materials. 50%/50% means that two insulator raw materials were mixed at a ratio of 50%:50%.

Copper was produced on both ends of the laminate 4 by sputtering and its surface was subjected to nickel plating and tin plating, and the first external terminal 5 and the second external terminal 6 were produced.

[Softening Point]

Table 1 shows the softening point of the insulator raw materials constituting the outermost layer 7.

[Coefficient of Thermal Expansion]

Table 1 shows the coefficient of thermal expansion of the insulator materials used for the outermost layer 7.

[Performance Evaluation]

Next, performances of the all-solid lithium ion secondary batteries produced as described above were evaluated. Spe- Comparative Examples 1 to 3

Comparative Examples 1 to 3 were comparative examples in which the outermost layer 7 was not provided. That is, like the all-solid lithium ion secondary battery 40 shown in FIG. 3, the outermost layer 7 was not provided at both ends of the positive electrode layer 1 and the negative electrode layer 2 in the lamination direction, and the solid electrolyte 3 was provided.

Here, in Table 1, the underlined column in the outermost layer of Comparative Examples 1 to 3 indicates that requirements of the present disclosure were not satisfied.

As shown in Table 1, in Comparative Examples 1 to 3, the residual voltage after 24 hours was significantly lower than that in Examples 1 to 12. This is thought to have been caused by the fact that, since no outermost layer 7 was formed in Comparative Examples 1 to 3, self-discharging occurred. This is thought to have been the cause of the residual voltage after 24 hours decreasing in Comparative Examples 1 to 3.

Examples 13 to 24

The laminate 41 having the configuration shown in FIG. 4 and FIG. 5 was produced by the simultaneous firing method. The structure of layers was as follows.

The positive electrode current collector layer 1A, the negative electrode current collector layer 2A, the positive electrode active material layer 1B, and the negative electrode active material layer 2B: as shown in Example 1 The solid electrolyte 3, the outermost layer 7, and the insulation layer 71: as shown in Table 2

The temperature during simultaneous firing was 800° C., and the firing time was 1 hour.

In the laminates 41 of Examples 13 to 24, the insulation layer 71 made of the same material as the outermost layer 7 was formed so that it surrounded a side surface that was not connected to the first external terminal 5 of the positive electrode layer 1 and a side surface that was not connected to the second external terminal 6 of the negative electrode layer 2 in a plan view.

Here, in Table 2, (100%) means that the outermost layer 7 and the insulation layer 71 were composed of only an insulator obtained by sintering the insulator raw materials. In addition, in Table 2, when two insulator raw materials are listed, this means that the outermost layer 7 and the insulation layer 71 were made of an insulator obtained by sintering two insulator raw materials. 50%/50% means that two insulator raw materials were mixed at a ratio of 50%:50%.

In the same manner as in Example 1, the first external terminal 5 and the second external terminal 6 were produced on the surfaces at both ends of the laminate 41.

[Softening Point]

Table 2 shows the softening point of the insulator raw materials constituting the outermost layer 7 and the insulation layer 71.

[Coefficient of Thermal Expansion]

Table 2 shows the coefficient of thermal expansion of the insulator raw materials used for the outermost layer 7 and the insulation layer 71.

[Performance Evaluation]

In the same manner as in Example 1, performances of the all-solid lithium ion secondary batteries of Examples 13 to 24 were evaluated. The residual voltage after 24 hours is shown in Table 2.

TABLE 2

| | Solid electrolyte | Outermost layer (insulator raw material) and insulation layer | Softening point (° C.) | Coefficient of thermal expansion × $10^{-7}$/° C. | Residual voltage (%) after 24 h self-charging |
|---|---|---|---|---|---|
| Example 13 | $Li_{1.3}Al_{0.3}Ti_{1.7}(PO_4)_3$ | $Bi_2O_3$—$B_2O_3$—$SiO_2$ (100%) | 526 | 79 | 84% |
| Example 14 | $Li_{1.3}Al_{0.3}Ti_{1.7}(PO_4)_3$ | $SiO_2$—BaO—CaO (100%) | 500 to 590 | 70 | 95% |
| Example 15 | $Li_{1.3}Al_{0.3}Ti_{1.7}(PO_4)_3$ | $SiO_2$—$B_2O_3$—RO (100%) | 780 | 52 to 60 | 98% |
| Example 16 | $Li_{1.3}Al_{0.3}Ti_{1.7}(PO_4)_3$ | $Bi_2O_3$—$B_2O_3$—$SiO_2$/$SiO_2$—BaO—CaO (50%/50%) | — | — | 87% |
| Example 17 | $Li_{1.3}Al_{0.3}Ti_{1.7}(PO_4)_3$ | $Bi_2O_3$—$B_2O_3$—$SiO_2$/$SiO_2$—$B_2O_3$—RO (50%/50%) | — | — | 97% |
| Example 18 | $Li_{1.3}Al_{0.3}Ti_{1.7}(PO_4)_3$ | $SiO_2$—BaO—CaO/$SiO_2$—$B_2O_3$—RO (50%/50%) | — | — | 97% |
| Example 19 | $Li_{1.07}Al_{0.69}Ti_{1.46}(PO_4)_3$ | $Bi_2O_3$—$B_2O_3$—$SiO_2$ (100%) | 526 | 79 | 82% |
| Example 20 | $Li_{1.07}Al_{0.69}Ti_{1.46}(PO_4)_3$ | $SiO_2$—BaO—CaO (100%) | 500 to 590 | 70 | 89% |
| Example 21 | $Li_{1.07}Al_{0.69}Ti_{1.46}(PO_4)_3$ | $SiO_2$—$B_2O_3$—RO (100%) | 780 | 52 to 60 | 98% |
| Example 22 | $Li_{1.5}Al_{0.5}Ge_{1.5}(PO_4)_3$ | $Bi_2O_3$—$B_2O_3$—$SiO_2$ (100%) | 526 | 79 | 81% |
| Example 23 | $Li_{1.5}Al_{0.5}Ge_{1.5}(PO_4)_3$ | $SiO_2$—BaO—CaO (100%) | 500 to 590 | 70 | 89% |
| Example 24 | $Li_{1.5}Al_{0.5}Ge_{1.5}(PO_4)_3$ | $SiO_2$—$B_2O_3$—RO (100%) | 780 | 52 to 60 | 98% |

As shown in Table 2, Examples 13 to 24 were the same as Examples 1 to 12 except that the insulation layer 71 made of the same material as the outermost layer 7 instead of the material of the solid electrolyte 3 was formed so that it surrounded aside surface that was not connected to the first external terminal 5 of the positive electrode layer 1 and aside surface that was not connected to the second external terminal 6 of the negative electrode layer 2 in a plan view.

As shown in Table 2, Examples 13 to 24 had a higher residual voltage after 24 hours than Examples 1 to 12. This is thought to have been caused by the fact that, in Examples 13 to 24, self-discharging was effectively curbed due to formation of the insulation layer 71, and a decrease in the residual voltage after 24 hours was minimized.

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte
4 Laminate 5 First external terminal
6 Second external terminal
7 Outermost layer
10 All-solid lithium ion secondary battery

What is claimed is:

1. An all-solid lithium ion secondary battery comprising a laminate including
a positive electrode layer;
a negative electrode layer which is alternately laminated with the positive electrode layer;
a solid electrolyte which is interposed at least between the positive electrode layer and the negative electrode layer; and
an outermost layer which is positioned at both ends in a lamination direction and does not contain lithium ions,
wherein the outermost layer is an insulating layer,
wherein the outermost layer is in direct contact with (1) the positive electrode layer and the solid electrolyte or (2) the negative electrode layer and the solid electrolyte,
wherein the outermost layer is provided outside the positive electrode layer, the negative electrode layer and the solid electrolyte in the lamination direction,
wherein the outermost layer is in direct contact with (1) an entire outer surface of the positive electrode layer closest to the outermost layer in the lamination direction or (2) an entire outer surface of the negative electrode layer closest to the outermost layer in the lamination direction, wherein the outermost layer is a glass sintered component having a softening temperature of 600° C. to 900° C., and
wherein in a test in which voltage was limited to 0 to 1.6 V, the all-solid lithium ion secondary battery was charged, and the residual voltage percentage after 24 hours from charging was at least 77%.

2. The all-solid lithium ion secondary battery according to claim 1,
wherein the outermost layer contains Si; and one of B and Ba.

3. The all-solid lithium ion secondary battery according to claim 1,
wherein the outermost layer is a sintered component of an insulator raw material having a coefficient of thermal expansion of $50 \times 10^{-7}/°$ C. or higher.

4. The all-solid lithium ion secondary battery according to claim 1,
wherein the outermost layer is a glass sintered component having a softening temperature of 600° C. to 800° C.

5. The all-solid lithium ion secondary battery according to claim 2,
wherein the outermost layer is a sintered component of an insulator raw material having a coefficient of thermal expansion of $50 \times 10^{-7}/°$ C. or higher.

6. The all-solid lithium ion secondary battery according to claim 1,
wherein the outermost layer is a sintered component of an insulator raw material having a coefficient of thermal expansion of $60 \times 10^{-7}/°$ C. or higher and $80 \times 10^{-7}/°$ C. or lower.

7. The all-solid lithium ion secondary battery according to claim 1,
wherein the outermost layer is composed of a sintered component obtained by mixing two or more insulator raw materials and firing the mixture.

8. The all-solid lithium ion secondary battery according to claim 1,
wherein the solid electrolyte is a Nasicon type compound, and
wherein the outermost layer contains $SiO_2 \cdot B_2O_3 \cdot RO$, wherein R is at least one of Mg, Ca, Sr, and Ba.

9. The all-solid lithium ion secondary battery according to claim 1,
wherein the outermost layer is in direct contact with (1) a surface of an outer side of the positive electrode layer in the lamination direction or (2) a surface of an outer side of the negative electrode layer in the lamination direction.

10. The all-solid lithium ion secondary battery according to claim 1,
wherein the glass sintered component is a sintered body of a glass selected from a group consisting of $Bi_2O_3 \cdot B_2O_3 \cdot Al_2O_3$, $SiO_2 \cdot BaO \cdot B_2O_3$, $PbO \cdot SiO_2 \cdot Al_2O_3$, $SiO_2 \cdot ZnO \cdot CaO$, $ZnO \cdot B_2O_3 \cdot SiO_2$, $SiO_2 \cdot BaO \cdot ZnO$, $BaO \cdot SiO_2 \cdot ZnO$, $SiO_2 \cdot RO$, $SiO_2 \cdot B_2O_3 \cdot BaO$, $SiO_2 \cdot TiO_2 \cdot R_2O$, $BaO \cdot SiO_2 \cdot B_2O_3$, $Bi_2O_3 \cdot ZnO \cdot B_2O_3$, $PbO \cdot SiO_2$, $RO \cdot B_2O_3 \cdot SiO_2$, and $ZnO \cdot B_2O_3$.

11. The all-solid lithium ion secondary battery according to claim 3,
wherein the sintered component is a sintered body selected from a group consisting of $Bi_2O_3 \cdot B_2O_3 \cdot SiO_2$, $Bi_2O_3 \cdot B_2O_3$, $Bi_2O_3 \cdot B_2O_3 \cdot Al_2O_3$, $Bi_2O_3 \cdot B_2O_3 \cdot ZnO$, $ZnO \cdot Bi_2O_3 \cdot B_2O_3$, $Bi_2O_3 \cdot ZnO \cdot B_2O_3$, $PbO \cdot SiO_2$, $PbO \cdot B_2O_3$, $SiO_2 \cdot BaO \cdot B_2O_3$, $PbO \cdot SiO_2 \cdot B_2O_3$, $PbO \cdot SiO_2 \cdot Al_2O_3$, $SiO_2 \cdot ZnO \cdot CaO$, $ZnO \cdot B_2O_3 \cdot SiO_2$, $SiO_2 \cdot BaO \cdot ZnO$, $BaO \cdot SiO_2 \cdot ZnO$, $SiO_2 \cdot RO$, $SiO_2 \cdot B_2O_3 \cdot BaO$, $BaO \cdot B_2O_3 \cdot ZnO$, $SiO_2 \cdot TiO_2 \cdot R_2O$, $BaO \cdot SiO_2 \cdot B_2O_3$, $RO \cdot B_2O_3 \cdot SiO_2$, $ZnO \cdot B_2O_3$, $SnO \cdot P_2O_5$, $SiO_2 \cdot BaO \cdot Li_2O$, $Bi_2O_3 \cdot BaO \cdot B_2O_3$, $SiO_2 \cdot R_2O \cdot TiO_2$, and $SiO_2 \cdot R_2O \cdot BaO$.

* * * * *